Sept. 30, 1947. F. E. MUNSCHAUER 2,428,336
FLUID OPERATED CLUTCH
Filed Feb. 9, 1946 3 Sheets-Sheet 1

INVENTOR
FREDERICK E. MUNSCHAUER
BY
Bean, Brooks, Buckley & Bean. ATTORNEYS

Sept. 30, 1947. F. E. MUNSCHAUER 2,428,336
FLUID OPERATED CLUTCH
Filed Feb. 9, 1946 3 Sheets-Sheet 3

INVENTOR
FREDERICK E. MUNSCHAUER
BY
Beau, Brooks, Buckley & Beau. ATTORNEYS

Patented Sept. 30, 1947

2,428,336

UNITED STATES PATENT OFFICE 2,428,336

FLUID OPERATED CLUTCH

Frederick E. Munschauer, Buffalo, N. Y., assignor to Niagara Machine and Tool Works, Buffalo, N. Y.

Application February 9, 1946, Serial No. 646,567

14 Claims. (Cl. 192—85)

This invention relates to drive means for machinery and particularly to novel apparatus for connecting and disconnecting the driving and driven portions of machine power transmission mechanism.

While the principles of the present invention may be applied wherever the advantages inherent in the invention manifest themselves, its application will be discussed chiefly in connection with metal-working presses. However, the advantages of the constructions of the present invention may be utilized in power shears, power brakes and other machines for fabricating metal and analogous materials. In such machinery, positive drive means is highly desirable, and the present invention provides such positive drive means under convenient fluid pressure control. The various positive drive clutches of the prior art have been subject to high rates of wear, both as to the positive drive clutch elements themselves and as to the means employed for effecting connection and disconnection. According to the arrangement of the present invention, no substantial wear of the apparatus is met with, excepting that which is normal and natural at the jaws of the clutch elements proper.

The design of the drive control means of the present invention is such that all working parts may be completely enclosed in a space of relatively small compass, such enclosure being a natural result of the mode of construction, making unnecessary the provision of separate housing or enclosing means. The working parts may thus be run in a lubricant bath and most of the noise incident to operation is dissipated in the enclosure and deadened by the lubricant, the latter preventing direct metal to metal contact when the clutch elements are engaged.

Conventional crank presses are provided with single-revolution clutches whose design is such that "inching" of the slide, as in setting up and in adjusting and aligning dies in the press, can only be accomplished by manual rotation of the flywheel or other parts of the drive means. The present arrangement renders such partial strokes of the press easy to accomplish by mere push button controlled power operation of the press slide.

The clutch control means of the present invention may be used with any kind of brake to insure accurate stopping of the press slide. The brake may be of the conventional constant drag type or may be subject to automatic braking and releasing control of any kind.

Various embodiments of the present invention are illustrated and described in the following specification by way of example, but it is to be understood that the scope of the present invention is not limited, excepting as defined in the appended claims.

In the drawings:

Fig. 4 is an enlarged fragmentary side elevational view of the clutch elements proper showing the tooth formation.

Figure 1:
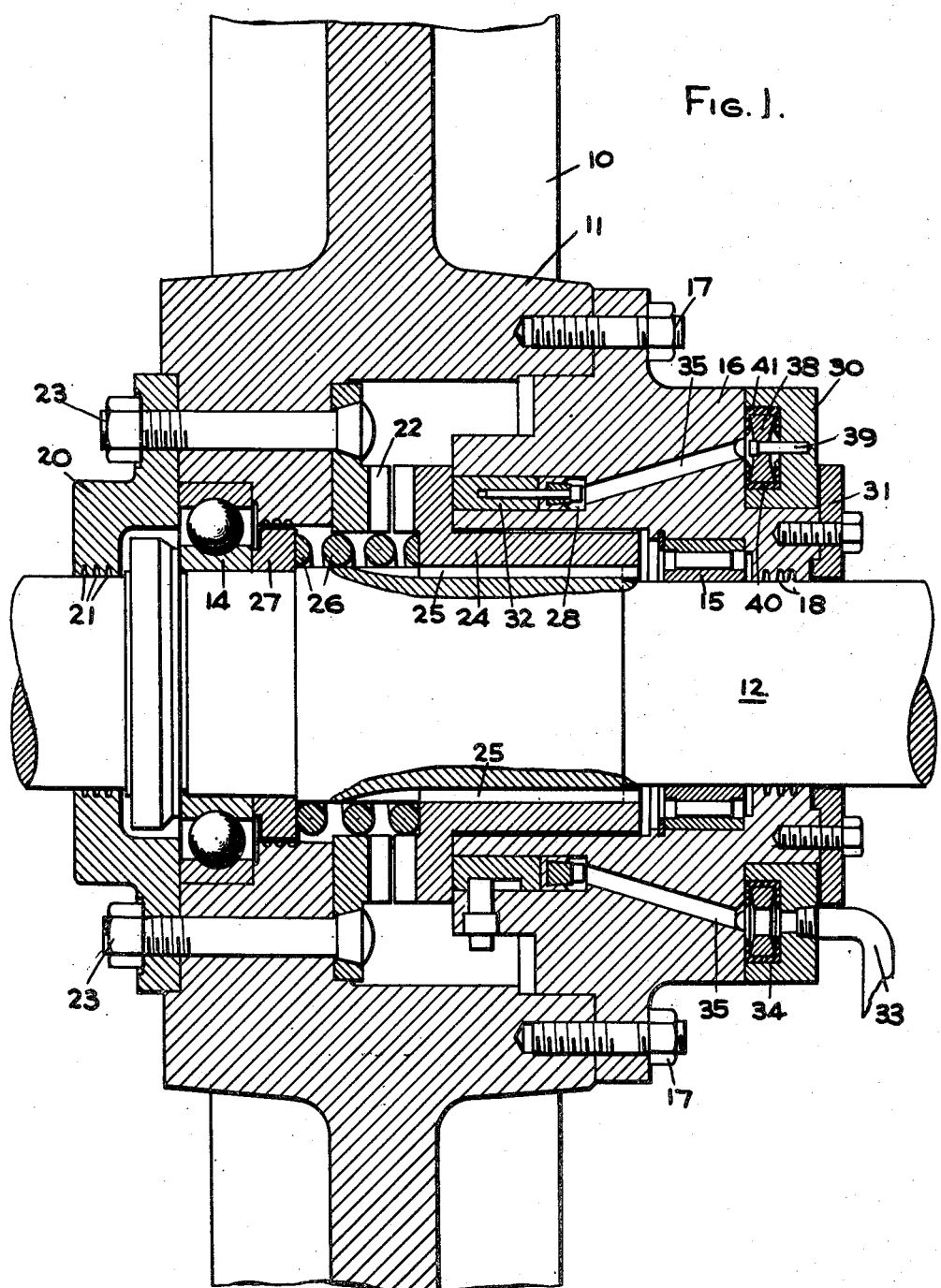
Fig. 1 is a longitudinal fragmentary cross-sectional view through one form of the apparatus of the present invention.
Figure 2:
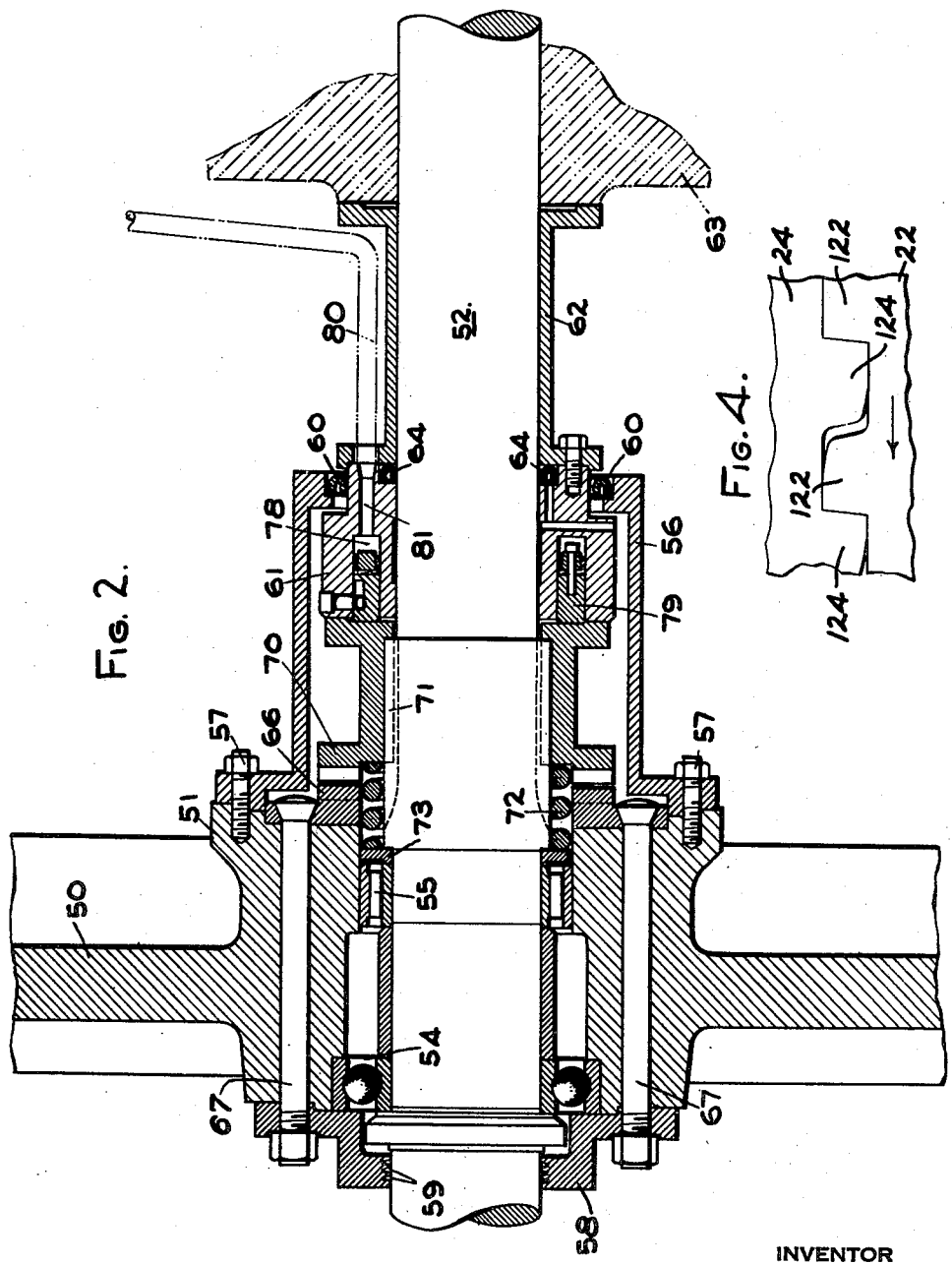
Fig. 2 is a similar view of another form of the invention.
Figure 3:
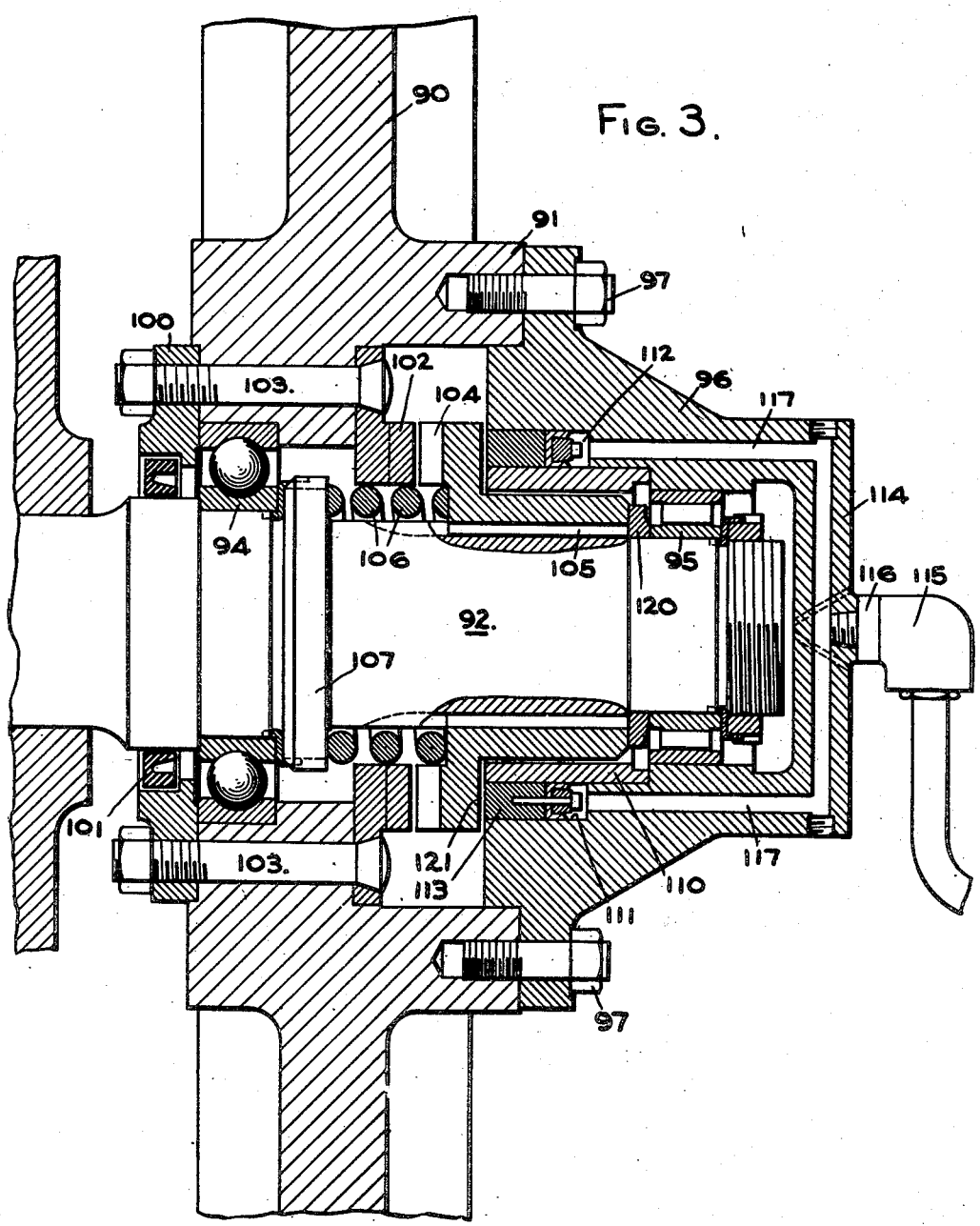
Fig. 3 is a similar view of a still further modification.

The embodiments of Figs. 1 and 2 are characterized by the fact that the driven shafts extend entirely through the drive and control mechanism whereas the embodiment of Fig. 3 shows the apparatus of the present invention mounted upon an end of a driven shaft. As between Figs. 1 and 2, the principal distinction is that in the embodiment of Fig. 1, a normally rotating flywheel gives bearing support to a normally stationary fluid pressure introducing annulus. In Fig. 2, the fluid pressure means is relatively stationary and may be fixed to and supported by a stationary part of the machine.

In the drawings like characters of reference denote like parts and, having reference to Fig. 1, the numeral 10 designates a flywheel, gear or other driving wheel element having a hub 11. The numeral 12 designates a shaft which is to be intermittently and selectively rotated by connection with the flywheel or other driving wheel 10. By way of illustration, the shaft 12 may comprise the crank shaft or eccentric shaft of a punch press, power shear, or similar machine or shaft 12 may have further driving connection with the ultimate driven shaft of the machine.

The flywheel 10 of Fig. 1 has antifriction bearing support upon shaft 12 as at 14 and 15, the latter bearing being effected through an intermediate hub or flange element 16 which is rigidly screwed to hub 11 of flywheel 10 as at 17. For lubricant retention, hub element 16 is provided with conventional fluid seal means 18 about shaft 12 and the other side of the hub 11 of flywheel 10 is provided with a flanged element 20 which is provided with conventional shaft encircling fluid seal means 21.

In the embodiment of Fig. 1, the hub 11 of flywheel 10 is hollowed out to accommodate clutch elements and operating means therefor. A jaw clutch element 22 is fixed with respect to flywheel 10 and in the illustrated instance, common screws 23 cooperate to maintain the hub 11, clutch element 22 and flanged element 20 as a fixed integral assembly. A movable clutch element is designated 24 and has spline connection with shaft 12 as at 25 whereby the clutch element 24 is fixed against rotation relative to shaft 12 but is axially movable thereon.

A compression coil spring 26 closely encircles shaft 12 and bears at one end against a ring 27, which in turn presses against the inner race of bearing 14. The opposite end of spring 26 bears against the adjacent face of clutch element 24 to urge the latter to a position of disengagement with respect to clutch element 22. It will be seen that both ends of spring 26 act against portions of the mechanism which are always fixed relative to shaft 12 and that spring 26 will accordingly rotate with or remain stationary with shaft 12.

The face of hub element 16 which is adjacent the hollowed out portion of hub 11 is provided with an annular recess 28 which comprises a fluid pressure chamber and is fitted with an annular piston 32. Introduction of fluid pressure into chamber 28 moves piston 32 to the left as viewed in Fig. 1 and causes engagement of the jaws of clutch elements 22 and 24.

Since hub element 16 rotates continuously with flywheel 10 special provision is made for conducting pressure fluid to chamber 28. In Fig. 1 the outer end of hub element 16 is formed to rotatably support a ring 30. An annular retaining plate 31 is screwed against the end of hub element 16 and the proportions are such that axial clearance for ring 30 is provided. Ring 30 has a fixed pipe connection 33 leading to an annular recess 34 provided in the face of ring 30 adjacent to the hub element 16 and passages 35 in hub element 16 lead from the recess 34 to the fluid pressure chamber 28.

The ring 30 is stationary while its supporting hub element 16 rotates during periods of machine operation. The recess 34 contains a ring 38 which is fixed with respect to ring 30 by means of screws 39. Annular flexible packings of U-shaped cross section are disposed over the inner and outer periphery of ring 38 as at 40 and 41. When fluid pressure is introduced through connection 33, the margins of the packings 40 and 41 engage intimately against the adjacent faces of hub element 16 and the bottom of recess 34 to provide an adequate fluid seal. In general use, periods during which pressure is applied through connection 33 are of relatively short duration as compared with the total period of time that the driving motor of the machine is in operation and the flywheel 10 accordingly rotating.

Control of application of fluid pressure to chamber 28 to engage the clutch and the cutting off of pressure to permit clutch release through the action of coil spring 26 may be manual or automatic and in either event may be accomplished by means conventional in the art to which the present invention pertains.

Having reference now to the embodiment of Fig. 2, the numeral 50 designates a flywheel, gear or other driving wheel element having a hub 51. The numeral 52 designates a shaft which is to be intermittently and selectively rotated by connection with the flywheel or other driving wheel 50. As in the previously described embodiment, the shaft 52 may comprise the crank shaft or eccentric shaft of a punch press, power shear, or similar machine or shaft 52 may have further driving connection with the ultimate driven shaft of the machine.

The flywheel 50 of Fig. 2 has antifriction bearing support upon shaft 52 as at 54 and 55. A sleeve element 56 is rigidly screwed to hub 51 of flywheel 50 as at 57. For lubricant retention, hub element 51 is provided with a flanged element 58 which contains conventional fluid seal means 59 which engages about shaft 52. The sleeve 56 at the other side of the hub 51 of flywheel 50 is provided with a fluid seal 60 which is disposed about a stationary annular body 61 which in turn is disposed about shaft 52 and may be supported against rotation in any convenient manner. In Fig. 2 a flanged sleeve 62 is fixed at one end to the annular body 61 and has its other end secured against the machine framework, indicated fragmentarily in dot and dash lines at 63. Shaft 52 rotates in body 61 when the machine is in actual operation and accordingly fluid seal means 64 are provided between body 61 and shaft 52.

In the embodiment of Fig. 2, the interior of sleeve 56 accommodates clutch elements and operating means therefor. A jaw clutch element 66 is fixed with respect to flywheel 50 and in the illustrated instance, common screws 67 cooperate to maintain the hub 51, clutch element 66 and flanged element 58 as a fixed integral assembly. A movable clutch element is designated 70 and has spline connection with shaft 52 as at 71 whereby the clutch element 70 is fixed against rotation relative to shaft 52 but is axially movable thereon.

A compression coil spring 72 closely encircles shaft 52 and bears at one end against a ring 73, which in turn presses against the inner race of bearing 55. The opposite end of spring 72 bears against the adjacent face of clutch element 70 to urge the latter to a position of disengagement with respect to clutch element 66. It will be seen that both ends of spring 72 act against portions of the mechanism which are always fixed relative to shaft 52 and that spring 72 will accordingly rotate with or remain stationary with shaft 52.

The face of the annular body 61 which is toward the interior of sleeve 56 is provided with an annular recess 78 which comprises a fluid pressure chamber and is fitted with an annular piston 79. Introduction of fluid pressure into chamber 78 moves piston 79 to the left as viewed in Fig. 2 and causes engagement of the jaws of clutch elements 66 and 70. Since the annular body is fixed and stationary a permanent pipe or conduit connection 80 may connect directly with a passage 81 therein leading to chamber 78. As in the case of Fig. 1, any desired means may be availed of for controlling the application of fluid pressure to chamber 78 through conduit 80 and passage 81.

Fig. 3 shows a clutch and clutch control arrangement especially suited to designs where the apparatus is to be associated with one end of a drive shaft. In Fig. 3, the numeral 90 designates a flywheel, gear or other driving wheel element having a hub 91. The numeral 92 designates an end portion of a shaft which is to be intermittently and selectively rotated by connection with the flywheel or other driving wheel 90. Here again, the shaft 92 may comprise the crank shaft or eccentric shaft of a punch press, power shear, or similar machine or shaft 92 may have further driving connection with the ultimate driven shaft of the machine.

The flywheel 90 of Fig. 3 has antifriction bearing support upon shaft 92 as at 94 and 95, the latter bearing being effected through an intermediate hub or flange element 96 which is rigidly screwed to hub 91 of flywheel 90 as at 97. For lubricant retention, the hub 91 of flywheel 90 is provided with a flanged element 100 which is provided with conventional shaft encircling fluid seal means 101.

In the embodiment of Fig. 3, the hub 91 of flywheel 90 is hollowed out to accommodate clutch elements and operating means therefor. A jaw clutch element 102 is fixed with respect to flywheel 90 and in the illustrated instance, common screws 103 cooperate to maintain the hub 91, clutch element 102 and flanged element 100 as a fixed integral assembly. A movable clutch element is designated 104 and has spline connection with shaft 92 as at 105 whereby the clutch element 104 is fixed against rotation relative to shaft 92 but is axially movable thereon.

A compression coil spring 106 closely encircles shaft 92 and bears at one end against a lock nut 107, which in turn engages against the inner race of bearing 94. The opposite end of spring 106 bears against the adjacent face of clutch element 104 to urge the latter to a position of disengagement with respect to clutch element 102. It will be seen that both ends of spring 106 act against portions of the mechanism which are always fixed relative to shaft 92 and that spring 10? will accordingly rotate with or remain stationary with shaft 92.

The face of hub element 96 which is adjacent the hollowed out portion of hub 91 has an annular sleeve 110 pressed thereinto and a counterbore 111 which cooperate to form an annular fluid pressure chamber 112 which is fitted with an annular piston 113. Introduction of fluid pressure into chamber 112 moves piston 113 to the left as viewed in Fig. 3 and causes engagement of the jaws of clutch elements 102 and 104. In this embodiment the entire fluid pressure chamber assembly including piston 113 rotates with flywheel 90. Accordingly, the end wall 114 of hub element 96 is provided with a commercially available elbow fitting 115 which includes a relatively rotatable end portion 116 which may be threaded into wall 114 to communicate with passages 117 leading to the fluid pressure chamber 112. The assembly 115, 116 is known in the art as a rotary seal.

It will be noted that shaft 92 carries a collar 120 having a reduced end engaging against the inner race of antifriction bearing 95; the opposite face, of larger diameter, being engaged by movable clutch element 104 when the clutch is disengaged. Since the inner race of bearing 95, the collar 120 and clutch element 104 all rotate or remain stationary with shaft 92, the end thrust of spring 96 is absorbed entirely without friction and with the surface 121 of clutch element 104 spaced slightly from the adjacent face of hub element 96. This detail of construction may be incorporated with equal facility and utility in the previously described embodiments of Figs. 1 and 2.

Fig. 4 illustrates portions of clutch elements 22 and 24 of the embodiment of Fig. 1 in fragmentary elevation to show the preferred tooth profile. However, reference to Fig. 1 is merely by way of example and the tooth formation illustrated in Fig. 4 is equally applicable to the embodiments of Figs. 2 and 3. Referring to Fig. 4, driving and driven clutch elements 22 and 24, respectively, have interengaging teeth 122 and 124. It will be noted that the driving faces of teeth 122 and 124 are set at a slight angle to the driving axis. This introduces a force component of the driving torque which tends to force the elements 22 and 24 apart in an axial direction. This component is less than the force of friction between the driving faces of the teeth but is of sufficient magnitude to materially lessen the force required on the part of spring 26 to effect separation of the clutch elements, particularly under load, against the frictional resistance of the tooth faces and the spline connection 25, still referring to the embodiment of Fig. 1 by way of example only. This in turn greatly decreases the burden placed upon piston 32 in overcoming the resistance of spring 26 in clutch-engaging operations.

Note that in each of the embodiments described in the foregoing, the opposing forces of fluid pressure and the compression coil spring is applied in a manner which insures absolute uniformity of pressure about the drive shaft, and that both of those forces are applied in annular zones located relatively close to the outside of the shaft. This latter insures direct and smooth application of forces, both fluid pressure and spring forces, with no danger or possibility of cocking or binding of the movable clutch element or any of the axially movable parts associated therewith.

It will be noted that in the preferred designs illustrated and described herein the clutch elements are held in normally open position by spring means and are closed by fluid pressure. This adds to the safety of the design since the likelihood of mechanical failure of the spring is relatively remote as compared with the likelihood of failure of compressed air or other operating fluid pressure. Upon failure of operating pressure, the clutch automatically opens and remains open. The term jaw clutch is used herein for convenience but that term is used to include any positive engagement type of clutch or interlocking means.

What is claimed is:

1. Drive means for power presses, shears, and like machines comprising a drive shaft, a normally rotating drive wheel including hub means rigid therewith and having bearing on said drive shaft, an annular chamber in said hub means and a clutch jaw element fixed in said hub means at one side of said chamber, an annular recess at the opposite side of said chamber, an axially slidable clutch jaw element keyed to said drive shaft in said chamber, a compression coil spring acting against said second clutch jaw element to normally hold the latter out of engagement with the fixed clutch jaw element, an annular piston in said recess and engageable against said second clutch jaw element, and fluid pressure means connectible with said recess and selectively actuatable to move said piston against said second clutch jaw element to move it to clutching engagement.

2. Drive means for power presses, shears, and like machines comprising a drive shaft, a normally rotating drive wheel including hub means rigid therewith and having bearing on said drive shaft, an annular chamber in said hub means and a clutch jaw element fixed in said hub means at one side of said chamber, an annular recess at the opposite side of said chamber, an axially slidable clutch jaw element keyed to said drive shaft in said chamber, a compression coil spring having one of its ends acting against said second clutch jaw element to normally hold the latter out of engagement with the fixed clutch jaw element, annular means fixed with respect to said shaft to provide a reaction support for the other end of said spring, an annular piston in said recess and engageable against said second clutch jaw element, and fluid pressure means connectible with said recess and selectively actuatable to move said piston against said second clutch jaw element to move it to clutching engagement.

3. Drive means for power presses, shears, and like machines comprising a drive shaft, a normally rotating drive wheel including hub means rigid therewith and having bearing on said drive shaft, an annular chamber in said hub means and a clutch element fixed in said hub means at one side of said chamber, an annular recess at the opposite side of said chamber, an axially slidable clutch element keyed to said drive shaft in said chamber, a compression coil spring acting against said second clutch element to normally hold the latter out of engagement with the fixed clutch jaw element, an annular piston in said recess and engageable against said second clutch element, and fluid pressure means connectible with said recess and selectively actuatable to move said piston against said second clutch element to move it to clutching engagement.

4. Drive means for power presses, shears, and like machines comprising a drive shaft and supporting a bearing therefor, a normally rotating drive wheel including hub means rigid therewith and having bearing on said drive shaft, an annular chamber in said hub means and a clutch jaw element fixed in said hub means at one side of said chamber, an axially slidable clutch jaw element keyed to said drive shaft in said chamber, a compression coil spring acting against said second clutch jaw element to normally hold the latter out of engagement with the fixed clutch jaw element, an annular body fixed with respect to said supporting bearing and extending into said annular chamber at the side opposite the fixed clutch jaw element and having an annular recess facing toward said second clutch jaw element, an annular piston in said recess and engageable against said second clutch jaw element, and fluid pressure means connectible with said recess and selectively actuatable to move said piston against said second clutch jaw element to move it to clutching engagement.

5. Drive means for power presses, shears, and like machines comprising a drive shaft and supporting a bearing therefor, a normally rotating drive wheel including hub means rigid therewith and having bearing on said drive shaft, an annular chamber in said hub means and a clutch element fixed in said hub means at one side of said chamber, an axially slidable clutch element keyed to said drive shaft in said chamber, a compression coil spring acting against said second clutch element to normally hold the latter out of engagement with the fixed clutch element, an annular body fixed with respect to said supporting bearing and extending into said annular chamber at the side opposite the fixed clutch element and having an annular recess facing toward said second clutch element, an annular piston in said recess and engageable against said second clutch element, and fluid pressure means connectible with said recess and selectively actuatable to move said piston against said second clutch element to move it to clutching engagement.

6. Drive means for power presses, shears, and like machines comprising a drive shaft, a normally rotating flywheel having bearing thereon, a pair of annular jaw clutch elements concentric with said drive shaft, one fixed to said flywheel and the other fixed against rotation relative to said drive shaft but axially movable therealong, a compression coil spring having one end fixed with respect to said drive shaft and its other end acting against said other clutch element to normally hold the latter out of engagement with said one clutch element, said drive means including an element fixed against axial movement and having a concentric annular fluid chamber opening toward said other clutch element at the side opposite said one clutch element, annular piston means in said chamber, and fluid pressure means selectively actuatable to move said piston means against said other clutch element to cause engagement of the clutch elements against the resistance of said coil spring.

7. Drive means for power presses, shears, and like machines comprising a drive shaft, a normally rotating flywheel having bearing thereon, a pair of annular jaw clutch elements concentric with said drive shaft, one fixed to said flywheel and the other fixed against rotation relative to said drive shaft but axially movable therealong, a collar on said drive shaft, a compression coil spring acting between said collar and said other clutch element to normally hold the latter out of engagement with said one clutch element, said flywheel including an element fixed thereto and having a concentric annular fluid chamber opening toward said other clutch element at the side opposite said one clutch element, annular piston means in said chamber, and fluid pressure means selectively actuatable to move said piston means against said other clutch element to cause engagement of the clutch elements against the resistance of said coil spring.

8. Drive means for power presses, shears, and like machines comprising a drive shaft, a normally rotating flywheel and a pair of axially spaced bearings supporting said flywheel for rotation on said shaft, a pair of annular jaw clutch elements concentric with said drive shaft and disposed between said bearings, one of said jaw clutch elements being fixed to said flywheel and the other fixed against rotation relative to said drive shaft but axially movable therealong, a collar on said drive shaft, a compression coil spring acting between said collar and said other clutch element to normally hold the latter out of engagement with said one clutch element, said drive means including an axially-fixed element having a concentric annular fluid chamber opening toward said other clutch element at the side opposite said one clutch element, annular piston means in said chamber, and fluid pressure means selectively actuatable to move said piston means against said other clutch element to cause engagement of the clutch elements against the resistance of said coil spring.

9. Drive means for power presses, shears, and like machines comprising a drive shaft, a normally rotating flywheel and an anti-friction bearing supporting said flywheel for rotation on said shaft, said bearing including an inner race fixed with respect to said shaft, a pair of annular jaw clutch elements concentric with said drive shaft, one fixed to said flywheel and the other fixed against rotation relative to said drive shaft but axially movable therealong, a compression coil spring acting between the inner race of said bearing and said other clutch element to normally hold the latter out of engagement with said one clutch element, said drive means including an axially-fixed element having a concentric annular fluid chamber opening toward said other clutch element at the side opposite said one clutch element, annular piston means in said chamber, and fluid pressure means selectively actuatable to move said piston means against said other clutch element to cause engagement of the clutch elements against the resistance of said coil spring.

10. Drive means for power presses, shears, and like machines comprising a drive shaft, a normally rotating flywheel and a pair of axially spaced anti-friction bearings supporting said flywheel for rotation on said shaft, each of said anti-friction bearings including an inner race fixed with respect to said shaft, a pair of annular jaw clutch elements concentric with said drive shaft and disposed between said bearings, one of said jaw clutch elements being fixed to said flywheel and the other fixed against rotation relative to said drive shaft but axially movable therealong, a compression coil spring acting between the inner race of the bearing adjacent said one clutch jaw element and said other clutch element to normally hold the latter out of engagement with said one clutch element, said drive means including an axially-fixed element having a concentric annular fluid chamber opening toward said other clutch element at the side opposite said one clutch element, annular piston means in said chamber, and fluid pressure means selectively actuatable to move said piston means against said other clutch means against said other clutch element to cause engagement of the clutch elements against the resistance of said coil spring.

11. Drive means for power presses, shears, and like machines comprising a drive shaft, a normally rotating flywheel having bearing thereon, a pair of annular jaw clutch elements concentric with said drive shaft, one fixed to said flywheel and the other fixed against rotation relative to said drive shaft but axially movable therealong, a collar on said drive shaft, a compression coil spring acting between said collar and said other clutch element to normally hold the latter out of engagement with said one clutch element, said drive means including an axially-fixed element having a concentric annular fluid chamber opening toward said other clutch element at the side opposite said one clutch element, annular piston means in said chamber, and fluid pressure means selectively actuatable to move said piston means against said other clutch element to cause engagement of the clutch elements against the resistance of said coil spring.

12. Drive means for power presses, shears, and like machines comprising a drive shaft, a normally rotating flywheel having bearing thereon, a pair of annular jaw clutch elements concentric with said drive shaft, one fixed to said flywheel and the other fixed against rotation relative to said drive shaft but axially movable therealong, a collar on said drive shaft, a compression coil spring acting between said collar and said other clutch element to normally hold the latter out of engagement with said one clutch element, said flywheel including an annular fluid chamber opening toward said other clutch element at the side opposite said one clutch element, annular piston means in said chamber, and fluid pressure means selectively actuatable to move said piston means against said other clutch element to cause engagement of the clutch elements against the resistance of said coil spring.

13. Drive means for power presses, shears, and like machines comprising a drive shaft, a normally rotating flywheel having bearing thereon, a pair of annular jaw clutch elements concentric with said drive shaft, one fixed to said flywheel and the other fixed against rotation relative to said drive shaft but axially movable therealong, a compression coil spring having one end fixed against axial movement and its other end acting against said other clutch element to normally hold the latter out of engagement with said one clutch element, said drive means including an element fixed against axial movement and having a concentric annular fluid chamber opening toward said other clutch element at the side opposite said one clutch element, annular piston means in said chamber, and fluid pressure means selectively actuatable to move said piston means against said other clutch element to cause engagement of the clutch elements against the resistance of said coil spring 14. Drive means for power presses, shears, and like machines comprising a drive shaft, a normally rotating flywheel having bearing thereon, a pair of annular jaw clutch elements concentric with said drive shaft, one fixed to said flywheel and the other fixed against rotation relative to said drive shaft but axially movable therealong, a compression coil spring having one end fixed with respect to said drive shaft and its other end acting against said other clutch element to normally hold the latter out of engagement with said one clutch element, said flywheel including an annular fluid chamber opening toward said other clutch element at the side opposite said one clutch element, annular piston means in said chamber, and fluid pressure means selectively actuatable to move said piston means against said other clutch element to cause engagement of the clutch elements against the resistance of said coil spring.

FREDERICK E. MUNSCHAUER.